US009413589B2

(12) United States Patent
Oliver et al.

(10) Patent No.: US 9,413,589 B2
(45) Date of Patent: Aug. 9, 2016

(54) METHOD FOR DISCOVERING A DYNAMIC ADDRESS OF A COMMUNICATION DEVICE

(75) Inventors: Brian Alexander Oliver, Fergus (CA); Richard John George, Waterloo (CA); Tu Dien Do, Kanata (CA); Scott Peter Gammon, Waterloo (CA); Kapil Nayar, Kanata (CA)

(73) Assignee: BlackBerry Limited, Waterloo (CA)

( * ) Notice: Subject to any disclaimer, the term of this patent is extended or adjusted under 35 U.S.C. 154(b) by 300 days.

(21) Appl. No.: 13/467,151

(22) Filed: May 9, 2012

(65) Prior Publication Data

US 2013/0117439 A1 May 9, 2013

Related U.S. Application Data

(60) Provisional application No. 61/557,207, filed on Nov. 8, 2011.

(51) Int. Cl.
*G06F 15/173* (2006.01)
*H04L 29/12* (2006.01)
*G06F 21/60* (2013.01)
*H04L 29/06* (2006.01)

(52) U.S. Cl.
CPC ............. *H04L 29/12* (2013.01); *G06F 21/606* (2013.01); *H04L 61/1529* (2013.01); *H04L 61/1541* (2013.01); *H04L 61/20* (2013.01); *H04L 61/2007* (2013.01); *H04L 61/2015* (2013.01); *H04L 61/2061* (2013.01); *H04L 61/35* (2013.01); *H04L 65/1069* (2013.01)

(58) Field of Classification Search
CPC ..... H04L 61/20; H04L 63/09; H04L 29/0836; H04L 29/08396; H04L 29/08405; H04L 29/08414; H04L 29/08423; H04L 67/1061; H04L 67/16; H04L 67/1068; H04L 67/18; H04L 67/104; H04L 67/34; H04L 61/2007; H04L 61/2015; H04L 61/2061; H04L 61/1541; H04W 8/005; H04W 48/16; H04W 4/003; H04W 4/12; G06F 21/606
USPC .................................................. 709/220–222
See application file for complete search history.

(56) References Cited

U.S. PATENT DOCUMENTS 7,673,336 B2 *  3/2010  Alse et al. ........................ 726/11
8,094,648 B2 *  1/2012  Skog ............................ 370/352
8,249,081 B2 *  8/2012  Chang ............... H04L 29/12066
                                                              370/395.3

(Continued)

OTHER PUBLICATIONS

Whirlpool; Is it possible to SIP forward Dynamic IP; http://forums.whirlpool.net.au/archive/1150889.
Homesip; The Milkfish Dynamic SIP Services—Homesip (est. 2006, offline since Mar. 2010) and Dynsip (est. 2009); http://wiki.milkfish.org.sipwerk.com/index.php?n=MilkfishServices.Homesip.
Crucial Paradigm Web Solutions; Web Hosting at Home with Dynamic DNS; www.crucialp.com/resources/tutorials/web-hosting/web-hosting-at-home-with-dynamic-dns.php.
Dynamic DNS—Wikipedia, the free encyclopedia; http://en.wikipedia.org/wiki/Dynamic_DNS.

(Continued)

*Primary Examiner* — Chirag R Patel
(74) *Attorney, Agent, or Firm* — RIDOUT & MAYBEE LLP (57) ABSTRACT

A method for discovering a communication device is disclosed. The method includes: receiving in the communication device a communication including a request for an address and an identification of an application, in response to receiving the communication, associating a dynamic address of the communication device with the identified application, and sending a second communication directly or indirectly to a client device, the second communication including the dynamic address. The communication device may further obtain a dynamic address in response to receiving the communication. The dynamic address may be used for a dedicated purpose, such as for receiving a file for subsequent use by the application.

24 Claims, 6 Drawing Sheets

(56) References Cited

U.S. PATENT DOCUMENTS

| | | | |
|---|---|---|---|
| 8,526,924 B1* | 9/2013 | Annan et al. | 455/414.3 |
| 8,959,570 B2* | 2/2015 | Wurth | 726/1 |
| 2005/0144260 A1* | 6/2005 | Han | 709/219 |
| 2006/0015562 A1* | 1/2006 | Kilian-Kehr | H04L 67/04 709/206 |
| 2006/0041759 A1* | 2/2006 | Kaliski et al. | 713/184 |
| 2006/0059337 A1* | 3/2006 | Poyhonen et al. | 713/165 |
| 2006/0094444 A1* | 5/2006 | Hansen | 455/456.1 |
| 2007/0171910 A1* | 7/2007 | Kumar | 370/392 |
| 2007/0207755 A1* | 9/2007 | Julia et al. | 455/217 |
| 2010/0241736 A1* | 9/2010 | Anka | 709/219 |

OTHER PUBLICATIONS

No-IP Free—Free Dynamic DNS—DDNS; http://www.no-ip.com/services/managed_dns/free_dynamic_dns.html.

Multiple DDNS Accounts—DD-WRT Wiki; http://www.dd-wrt.com/wiki/index.php/Multiple_DDNS_Accounts.

Dynamic DNS—DD-WRT Wiki—http://www.dd-wrt.com/wiki/index.php/DDNS_-How_to_setup_Custom_DDNS_settings_using_Embedded_inadyn_-HOWTO.

Dynamic Domain Name System (DDNS); http://www.dd-wrt.com/wiki/images/b/be/Dns_207.png.

* cited by examiner

METHOD FOR DISCOVERING A DYNAMIC ADDRESS OF A COMMUNICATION DEVICE

CROSS-REFERENCE

This application claims the benefit of U.S. Patent Application No. 61/557,207 filed Nov. 8, 2011, the contents of which are incorporated herein by reference.

TECHNICAL FIELD

Example embodiments relate to the field of discovering communication devices.

BACKGROUND

Some conventional existing systems include an address being dynamically assigned from a service. When a device on a network is assigned an address dynamically, it is difficult for other network devices to contact that address. This makes peer to peer communication difficult without some other means for determining the network address corresponding to the device. The device can publish its dynamically assigned address via methods such as Domain Name System (DNS) or Dynamic DNS (DDNS), but this can be a security concern as it may not allow the addressee to pick and choose who gets to receive its addressing information. Another difficulty is that many existing dynamic servers typically take an active role in the discovery process, for example generating, receiving, and/or relaying the dynamic address. This can result in a possible security breach of the address between peer devices.

Additional difficulties with existing systems may be appreciated in view of the detailed description below.

BRIEF DESCRIPTION OF THE DRAWINGS

Embodiments will now be described, by way of example only, with reference to the attached Figures, wherein.

Like reference numerals may be used throughout the Figures to denote similar elements and features.

DETAILED DESCRIPTION OF EXAMPLE EMBODIMENTS

Example embodiments generally relate to facilitating discovery of a communication device. In example embodiments, a requesting client device can request an address of the communication device. Along with the request is an identification of an application, wherein the communication device is configured to associate the address with the identified application of the communication device. In response, the communication device may generate or obtain a dynamic address and associate the dynamic address with the application. The dynamic address may be used for a dedicated purpose, such as for receiving a file for subsequent use by the application.

In accordance with an example embodiment, there is provided a method for discovering a communication device, the method including: receiving in the communication device a communication including a request for an address and an identification of an application; in response to receiving the communication, associating a dynamic address of the communication device with the identified application; and sending a second communication directly or indirectly to a client device, the second communication including the dynamic address.

In accordance with another example embodiment, there is provided a communication device including a processor, memory, and a communication subsystem for sending and receiving communications. The processor is configured for: receiving in the communication device a communication including a request for an address and an identification of an application, in response to receiving the communication, associating a dynamic address of the communication device with the identified application, and sending a second communication directly or indirectly to a client device, the second communication including the dynamic address.

In accordance with yet another example embodiment, there is provided a non-transitory computer readable medium having instructions stored thereon executable by a processor for facilitating discovery of a communication device. The instructions comprise instructions for: receiving in the communication device a communication including a request for an address and an identification of an application, in response to receiving the communication, associating a dynamic address of the communication device with the identified application, and sending a second communication directly or indirectly to a client device, the second communication including the dynamic address.

Figure 1:
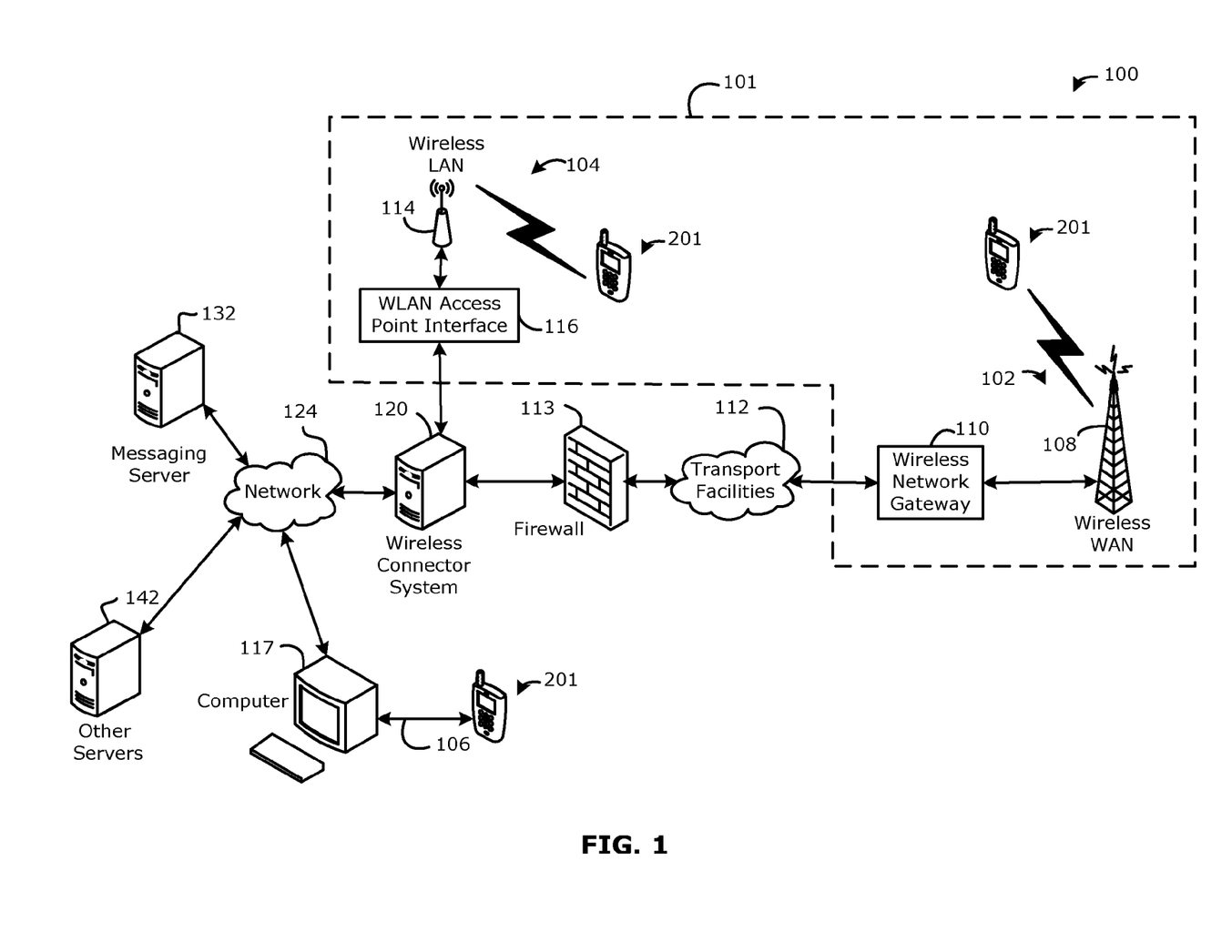
FIG. 1 illustrates a block diagram of a communications system to which embodiments may be applied.

Reference is first made to FIG. 1 which shows in block diagram form a communication system 100 in which example embodiments can be applied. The communication system 100 comprises a number of mobile communication devices (mobile devices) 201 which may be connected to the remainder of system 100 in any of several different ways. Accordingly, several instances of mobile communication devices 201 are depicted in FIG. 1 employing different example ways of connecting to system 100. Mobile communication devices 201 are connected to a wireless communication network 101 which may comprise one or more of a Wireless Wide Area Network (WWAN) 102 and a Wireless Local Area Network (WLAN) 104 or other suitable network arrangements. In some embodiments, the mobile communication devices 201 are configured to communicate over both the WWAN 102 and WLAN 104, and to roam between these networks. In some embodiments, the wireless network 101 may comprise multiple WWANs 102 and WLANs 104.

The WWAN 102 may be implemented as any suitable wireless access network technology. By way of example, but not limitation, the WWAN 102 may be implemented as a wireless network that includes a number of transceiver base stations 108 (one of which is shown in FIG. 1) where each of the base stations 108 provides wireless Radio Frequency (RF) coverage to a corresponding area or cell. The WWAN 102 is typically operated by a mobile network service provider that provides subscription packages to users of the mobile communication devices 201. In some embodiments, the WWAN 102 conforms to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA2000, EDGE (Enhanced Data rates for GSM Evolution), UMTS (Universal Mobile Telecommunication Systems), HSDPA (High-Speed Downlink Packet Access), HSUPA (High-Speed Uplink Packet Access), 3GPP Long Term Evolution (LTE), IEEE 802.16e (also referred to as Worldwide Interoperability for Microwave Access or "WiMAX"), or various other networks. Although WWAN 102 is described as a "Wide-Area" network, that term is intended herein also to incorporate wireless Metropolitan Area Networks (WMAN) and other similar technologies for providing coordinated service wirelessly over an area larger than that covered by typical WLANs.

The WWAN 102 may further comprise a wireless network gateway 110 which connects the mobile communication devices 201 to transport facilities 112, and through the transport facilities 112 to a wireless connector system 120. Transport facilities may include one or more private networks or lines, the public internet, a virtual private network, or any other suitable network. The wireless connector system 120 may be operated, for example, by an organization or enterprise such as a corporation, university, or governmental department, which allows access to a network 124 such as an internal or enterprise network and its resources, or the wireless connector system 120 may be operated by a mobile network provider. In some embodiments, the network 124 may be realised using the internet rather than an internal or enterprise network.

The wireless network gateway 110 provides an interface between the wireless connector system 120 and the WWAN 102, which facilitates communication between the mobile communication devices 201 and other devices (not shown) connected, directly or indirectly, to the WWAN 102. Accordingly, communications sent via the mobile communication devices 201 are transported via the WWAN 102 and the wireless network gateway 110 through transport facilities 112 to the wireless connector system 120. Communications sent from the wireless connector system 120 are received by the wireless network gateway 110 and transported via the WWAN 102 to the mobile communication devices 201.

The WLAN 104 comprises a wireless network which, in some embodiments, conforms to IEEE 802.11x standards (sometimes referred to as Wi-Fi) such as, for example, the IEEE 802.11a, 802.11b and/or 802.11g standard. Other communication protocols may be used for the WLAN 104 in other embodiments such as, for example, IEEE 802.11n, IEEE 802.16e (also referred to as Worldwide Interoperability for Microwave Access or "WiMAX"), or IEEE 802.20 (also referred to as Mobile Wireless Broadband Access). The WLAN 104 includes one or more wireless RF Access Points (AP) 114 (one of which is shown in FIG. 1) that collectively provide a WLAN coverage area.

The WLAN 104 may be a personal network of the user, an enterprise network, or a hotspot offered by an internet service provider (ISP), a mobile network provider, or a property owner in a public or semi-public area, for example. The access points 114 are connected to an access point (AP) interface 116 which may connect to the wireless connector system 120 directly (for example, if the access point 114 is part of an enterprise WLAN 104 in which the wireless connector system 120 resides), or indirectly via the transport facilities 112 if the access point 14 is a personal Wi-Fi network or Wi-Fi hotspot (in which case a mechanism for securely connecting to the wireless connector system 120, such as a virtual private network (VPN), may be required). The AP interface 116 provides translation and routing services between the access points 114 and the wireless connector system 120 to facilitate communication, directly or indirectly, with the wireless connector system 120.

The wireless connector system 120 may be implemented as one or more servers, and is typically located behind a firewall 113. The wireless connector system 120 manages communications, including email messages, to and from a set of managed mobile communication devices 201. The wireless connector system 120 also provides administrative control and management capabilities over users and mobile communication devices 201 which may connect to the wireless connector system 120.

The wireless connector system 120 allows the mobile communication devices 201 to access the network 124 and connected resources and services such as a messaging server 132 (for example, a Microsoft Exchange™, IBM Lotus Domino™, or Novell GroupWise™ email messaging server) and optionally other servers 142. The other servers 142 may comprise a content server for providing content such as internet content or content from an organization's internal servers to the mobile communication devices 201 in the wireless network 101, an application server for implementing server-based applications such as instant messaging (IM) applications, or a web server for providing content accessible by a web browser.

For the purposes of the described example embodiments, any server within an enterprise network, such as a messaging server or any other server, will be referred to as an enterprise server. A service may include one or more servers or enterprise servers.

The wireless connector system 120 typically provides a secure exchange of data (e.g., email messages, personal information manager (PIM) data, and IM data) with the mobile communication devices 201. In some embodiments, communications between the wireless connector system 120 and the mobile communication devices 201 are encrypted. In some embodiments, communications are encrypted using a symmetric encryption key implemented using Advanced Encryption Standard (AES) or Triple Data Encryption Standard (Triple DES) encryption. Private encryption keys are generated in a secure, two-way authenticated environment and are used for both encryption and decryption of data.

Encryption keys used for communications or for encrypting data stored on the device can be protected via various means such as a password or hardware-based protections, such as those afforded by hardware-based key stored mechanisms.

The wireless network gateway 110 is adapted to send data packets received from the mobile device 201 over the WWAN 102 to the wireless connector system 120. The wireless connector system 120 then sends the data packets to the appropriate connection point such as the messaging server 132, or other servers 142. Conversely, the wireless connector system 120 sends data packets received, for example, from the messaging server 132, or other servers 142 to the wireless network gateway 110 which then transmit the data packets to the destination mobile device 201. The AP interfaces 116 of the WLAN 104 provide similar sending functions between the mobile device 201, the wireless connector system 120 and network connection point such as the messaging server 132, or other servers 142.

The network 124 may comprise a private local area network, metropolitan area network, wide area network, the public internet or combinations thereof and may include virtual networks constructed using any of these, alone, or in combination.

A mobile device 201 may alternatively connect to the wireless connector system 120 using a computer 117, such as desktop or notebook computer, via the network 124. A link 106 may be provided for exchanging information between the mobile device 201 and computer 117 connected to the wireless connector system 120. The link 106 may comprise one or both of a physical interface and short-range wireless communication interface. The physical interface may comprise one or combinations of an Ethernet connection, Universal Serial Bus (USB) connection, Firewire™ (also known as an IEEE 1394 interface) connection, or other serial data connection, via respective ports or interfaces of the mobile device 201 and computer 117. The short-range wireless communication interface may be a personal area network (PAN) interface. A personal area network is a wireless point-to-point connection meaning no physical cables are required to connect the two end points. The short-range wireless communication interface may comprise one or a combination of an infrared (IR) connection such as an Infrared Data Association (IrDA) connection, a short-range radio frequency (RF) connection such as one specified by IEEE 802.15.1 or the Bluetooth® special interest group, or IEEE 802.15.3a, also referred to as Ultra-Wideband (UWB), or other PAN connection.

It will be appreciated that the above-described communication system is provided for the purpose of illustration only, and that the above-described communication system comprises one possible communication network configuration of a multitude of possible configurations for use with the mobile communication devices 201. Example embodiments may be employed in connection with any other type of network and associated devices that are effective in implementing or facilitating wireless communication. Suitable variations of the communication system will be understood to a person of skill in the art and are intended to fall within the scope of the present example embodiments.

Figure 2:
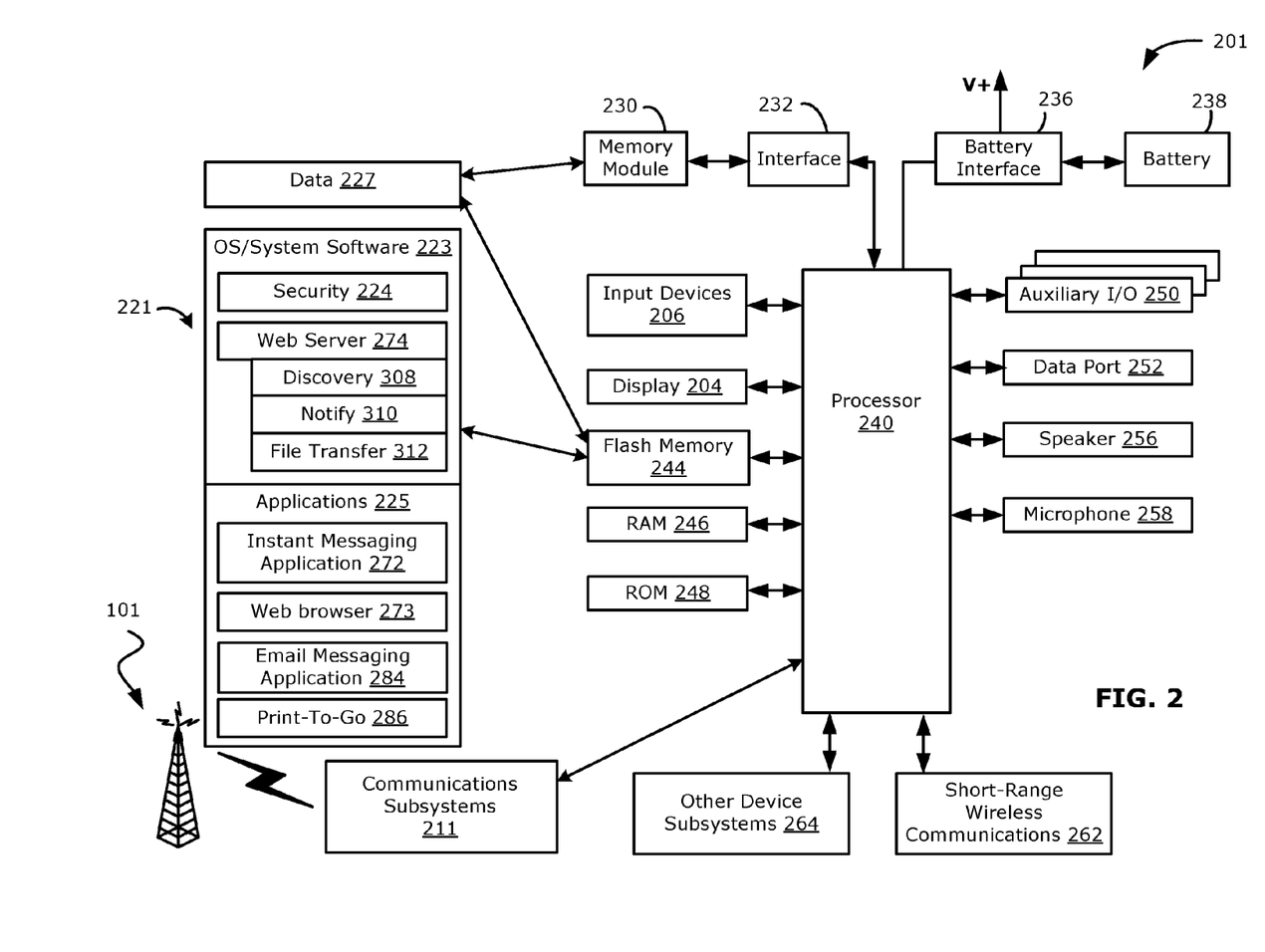
FIG. 2 illustrates a block diagram showing an example of a mobile communication device ("mobile device") that can be used in the communications system of FIG. 1.

Reference is now made to FIG. 2 which illustrates a mobile device 201 in which example embodiments can be applied. The mobile device 201 is a two-way communication device having data and/or voice communication capabilities, and the capability to communicate with other computer systems, for example, via the Internet. Depending on the functionality provided by the mobile device 201, in various embodiments the device 201 may be a multiple-mode communication device configured for both data and voice communication, a smartphone, a mobile telephone or a PDA (personal digital assistant) enabled for wireless communication, a tablet-based computer, or a computer system with a wireless modem.

The mobile device 201 includes a case (not shown) housing the components of the device 201. The internal components of the device 201 are constructed on a printed circuit board (PCB). The mobile device 201 includes a controller comprising at least one processor 240 (such as a microprocessor) which controls the overall operation of the device 201. The processor 240 interacts with device subsystems such as a wireless communication subsystem 211 for exchanging radio frequency signals with the wireless network 101 to perform communication functions. The processor 240 interacts with additional device subsystems including a display screen 204 such as a liquid crystal display (LCD) screen, input devices 206 such as a keyboard and control buttons, flash memory 244, random access memory (RAM) 246, read only memory (ROM) 248, auxiliary input/output (I/O) subsystems 250, data port 252 such as serial data port, such as a Universal Serial Bus (USB) data port, speaker 256, microphone 258, short-range communication subsystem 262, and other device subsystems generally designated as 264. Some of the subsystems shown in FIG. 2 perform communication-related functions, whereas other subsystems may provide "resident" or on-device functions.

The device 201 may comprise a touchscreen display in some embodiments. The touchscreen display may be constructed using a touch-sensitive input surface connected to an electronic controller and which overlays the display screen 204. The touch-sensitive overlay and the electronic controller provide a touch-sensitive input device and the processor 240 interacts with the touch-sensitive overlay via the electronic controller.

The mobile device 201 may communicate with any one of a plurality of fixed transceiver base stations 108 (FIG. 1) of the wireless network 101 within its geographic coverage area. The mobile device 201 may send and receive communication signals over the wireless network 101 after the required network registration or activation procedures have been completed.

The processor 240 operates under stored program control and executes software modules 221 stored in memory such as persistent memory, for example, in the flash memory 244. As illustrated in FIG. 2, the software modules 221 comprise operating system software 223. The software modules 221 comprise software applications 225, which for example, may include a text or instant messaging application 272, a web browser 273, and an email messaging application 284. A web server 274 may at least partly be performed from the operating system software 223, system software, or daemon. The system software can include processes at an operating layer or system-level that are configured to automatically interpret and process incoming and outgoing communications, using protocols or formats for communication exchange. Although it may be understood that a software application 274 may be configured to perform some aspects of the system software or web server 274, these are typically intended to mimic the functions of the system software, and would be considered to be "system software" for the purposes of example embodiments.

In some example embodiments, the functions performed by each of the applications 272, 273, and 284 may each be realized as a plurality of independent elements, and any one or more of these elements may be implemented as parts of other software applications 225. In some example embodiments, one or more applications 225 are configured to receive data, such as files, documents or other information, from a server, such as a messaging server 132 (FIG. 1), or a web or other server 142 (FIG. 1). Non-limiting examples of data received from a server may include email attachments, files transferred via file transfer protocol (FTP) or any other protocol, documents or files downloaded from a web page via a web browser, or files sent via a text or instant messaging application. Non-limiting examples of services performed by the web server 274 include a telnet server, an http or https server, or an ftp server. Some example software applications 225 or applications implemented through the web server 274 may include peer to peer communications, electronic mail, Internet faxing, instant messaging and voice-over-IP (VoIP).

For illustration purposes, FIG. 2 shows a security module 224 as a component of the operating system 223. In some example embodiments, the security module 224 may perform security functions including the generation and management of tokens, private keys and/or public keys. The security module 224 may be used to perform the encryption/decryption or the signing/verification of data using such keys or tokens.

The software modules 221 or parts thereof may be temporarily loaded into volatile memory such as the RAM 246. The RAM 246 is used for storing runtime data variables and other types of data or information. Although specific functions are described for various types of memory, this is merely one example, and a different assignment of functions to types of memory could also be used.

In some embodiments, the auxiliary input/output (I/O) subsystems 250 may comprise an external communication link or interface, for example, an Ethernet connection. The mobile device 201 may comprise other wireless communication interfaces for communicating with other types of wireless networks, for example, a wireless network such as an orthogonal frequency division multiplexed (OFDM) network or a GPS (Global Positioning System) subsystem comprising a GPS transceiver for communicating with a GPS satellite network (not shown). The auxiliary I/O subsystems 250 may comprise a pointing or navigational tool (input device) such as a clickable trackball or scroll wheel or thumbwheel, or a vibrator for providing vibratory notifications in response to various events on the device 201 such as receipt of an electronic message or incoming phone call, or for other purposes such as haptic feedback (touch feedback).

In some embodiments, the mobile device 201 includes a removable memory card 230 (typically comprising flash memory) and a memory card interface 232. The mobile device 201 can store data 227 on the removable memory card 230, in an erasable persistent memory, which in one example embodiment is the flash memory 244, or on both a removable memory card and in an erasable persistent memory.

In various embodiments, the data 227 includes service data comprising information required by the mobile device 201 to establish and maintain communication with the wireless network 101. The data 227 may also include user application data such as email messages, address book and contact information, calendar and schedule information, word processor documents, spreadsheets, presentation slides, image files, audio and video files and other commonly stored user information stored on the mobile device 201 by its user, and other data. The data 227 stored in the persistent memory (e.g. flash memory 244) of the mobile device 201 may be organized, at least partially, into a number of databases each containing data items of the same data type or associated with the same application. For example, email messages, contact records, and task items may be stored in individual databases within the device memory.

In some embodiments, the mobile device 201 is provided with a service routing application programming interface (API) which provides an application with the ability to route traffic through a serial data (i.e., USB) or Bluetooth® (Bluetooth® is a registered trademark of Bluetooth SIG, Inc.) connection to the host computer system using standard connectivity protocols. When a user connects their mobile device 201 to the host computer system via a USB cable or Bluetooth® connection, traffic that was destined for the wireless network 101 is automatically routed to the mobile device 201 using the USB cable or Bluetooth® connection. Similarly, any traffic destined for the wireless network 101 is automatically sent over the USB cable Bluetooth® connection to the host computer system for processing.

The mobile device 201 also includes a battery 238 as a power source, which is typically one or more rechargeable batteries that may be charged, for example, through charging circuitry coupled to a battery interface such as the serial data port 252. The battery 238 provides electrical power to at least some of the electrical circuitry in the mobile device 201, and the battery interface 236 provides a mechanical and electrical connection for the battery 238. The battery interface 236 is coupled to a regulator (not shown) which provides power V+ to the circuitry of the mobile device 201.

The short-range communication subsystem 262 is an additional optional component which provides for communication between the mobile device 201 and different systems or devices, which need not necessarily be similar devices. For example, the subsystem 262 may include an infrared device and associated circuits and components, or a wireless bus protocol compliant communication mechanism such as a Bluetooth® communication module to provide for communication with similarly-enabled systems and devices.

A predetermined set of applications that control basic device operations, including data and possibly voice communication applications will normally be installed on the mobile device 201 during or after manufacture. Additional applications and/or upgrades to the operating system 223 or software applications 225 may also be loaded onto the mobile device 201 through the wireless network 101, the auxiliary I/O subsystem 250, the serial port 252, the short-range communication subsystem 262, or other suitable subsystem 264. The downloaded programs or code modules may be permanently installed, for example, written into the program memory (i.e. the flash memory 244), or written into and executed from the RAM 246 for execution by the processor 240 at runtime. Such flexibility in application installation increases the functionality of the mobile device 201 and may provide enhanced on-device functions, communication-related functions, or both. For example, secure communication applications may enable electronic commerce functions and other such financial transactions to be performed using the mobile device 201.

The mobile device 201 may provide two principal modes of communication: a data communication mode and an optional voice communication mode. In the data communication mode, a received data signal such as a text message, an email message, or Web page download will be processed by the communication subsystem 211 and input to the processor 240 for further processing. For example, a downloaded Web page may be further processed by a browser application or an email message may be processed by the email messaging application and output to the display 204. A user of the mobile device 201 may also compose data items, such as email messages, for example, using the input devices in conjunction with the display screen 204. These composed items may be transmitted through the communication subsystem 211 over the wireless network 101.

In the voice communication mode, the mobile device 201 provides telephony functions and operates as a typical cellular phone. The overall operation is similar, except that the received signals would be output to the speaker 256 and signals for transmission would be generated by a transducer such as the microphone 258. The telephony functions are provided by a combination of software/firmware (i.e., the voice communication module) and hardware (i.e., the microphone 258, the speaker 256 and input devices). Alternative voice or audio I/O subsystems, such as a voice message recording subsystem, may also be implemented on the mobile device 201. Although voice or audio signal output is typically accomplished primarily through the speaker 256, the display screen 204 may also be used to provide an indication of the identity of a calling party, duration of a voice call, or other voice call related information.

For the purposes of some example embodiments, Session Initiation Protocol (SIP) will be utilized, although it is appreciated that other or additional protocols may be used. As understood by those of ordinary skill in the art, SIP is the IETF (Internet Engineering Task Force) standard for multimedia session management, and more specifically is an application-layer control protocol for establishing, maintaining, modifying and terminating multimedia sessions between two or more endpoints. SIP is defined in J. Rosenberg et al., "RFC 3261—Session Initiation Protocol" (June 2002), the contents of which are herein incorporated by reference. Other protocols, extensions, and standards related to SIP may be implemented and referenced, as appropriate.

A difficulty with some existing conventional systems is that there may be limited flexibility when assigning an address of a communication device. In some conventional systems, the communication device typically uses a same assigned address for most or all of the applications or services. Another difficulty, for example, is that some Domain Name System (DNS) or other servers typically take an active role in the discovery process, for example receiving, relaying, and sometimes generating the dynamic address. This can result in a possible security breach of the address between peer devices.

Further, in some conventional systems a request for the address of a communication device can merely include a bare request, without any additional information. In some conventional systems, at most merely a system software may be inherently identified due to the nature of the request, for example for telnet, http, or ftp, or some discovery protocols.

In accordance with some example embodiments, there is generally provided methods for facilitating discovery of a communication device. In example embodiments, a requesting client device can request an address of the communication device. Along with the request is an identification of an application, wherein a communication device can be configured to interpret the request as an instruction or a request to associate the address with the identified application of the communication device. In response, the communication device may obtain a dynamic address and associate the dynamic address with the application. Accordingly, the dynamic address can be used for a dedicated purpose, such as receiving a file for subsequent use by the application.

Figure 3:
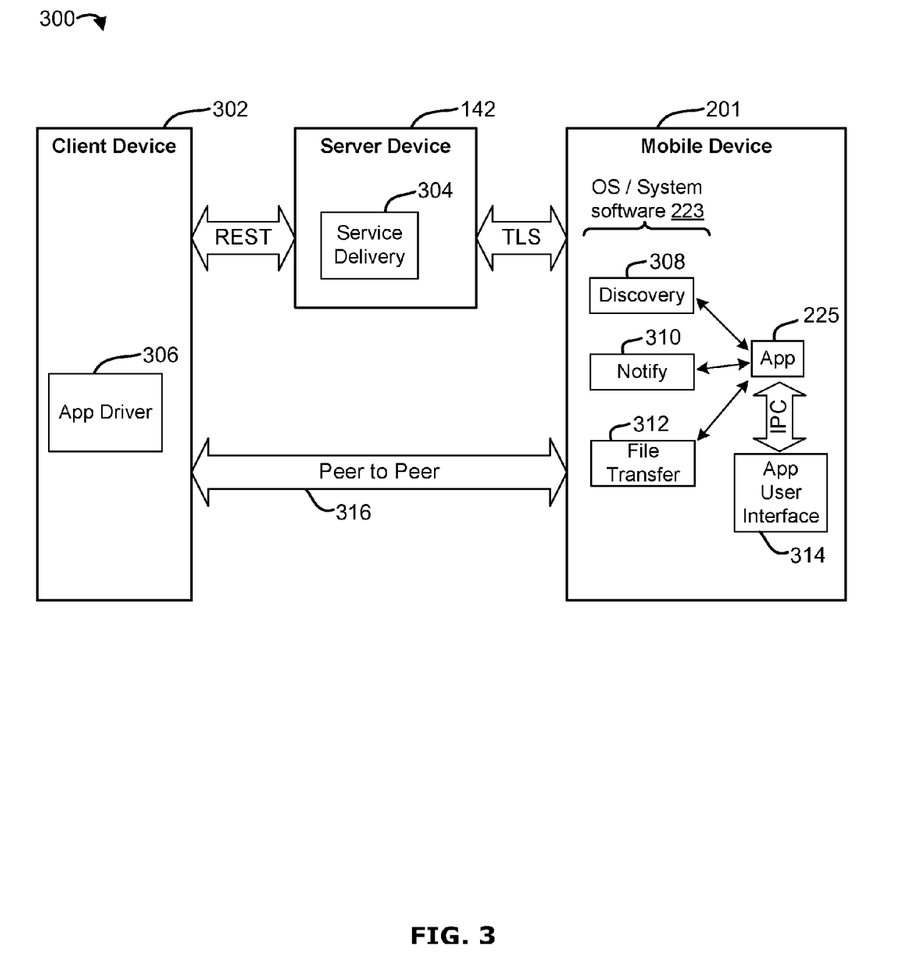
FIG. 3 illustrates an example system for facilitating discovery of a mobile device.

Reference is now made to FIG. 3, which illustrates an example configuration of a system 300 for facilitating discovery of the mobile device 201 by a client device 302, and subsequently establishing a peer to peer session 316 there between. Example methods described in detail herein may be applied to the system 300. In FIG. 3, one of the other servers 142 (hereinafter service device 142) may be configured to include a SIP server. For example, the SIP server may also implement multimedia functions such as videoconferencing, call session setup and teardown, etc., or various client-specific applications for operation at the user-level or having user interfaces, sometimes referred to as "apps". In some example embodiments the server device 142 may be used to facilitate discovery of the mobile device 201. This may include using, for example, a service delivery module 304. The service delivery module 304 may include a SIP component, a Representational State Transfer (REST) interface component, and a discovery component for transcoding the REST requests into SIP and back, as well as providing some token verification and routing to devices.

In some example embodiments, the mobile device 201 has subscribed or logged into the server device 142, and a secure connection is established there between. Similarly, in some example embodiments, the client device 302 has subscribed or logged into the server device 142, and a secure connection such as HTTPS/TLS is established there between. In an example implementation, as shown in FIG. 3, the client device 302 can communicate with the server device 142 over an HTTPS/TLS session using Representational State Transfer (REST), as understood in the art. The system 300 can be used to discover the mobile device 201 so that a peer to peer connection 316 or secure session can be established between the client device 302 and the mobile device 201, as shown.

In some example embodiments, the server device 142 communicates with the client device 302 at an address that is different than the dynamic address. The dynamic address may be designated for communicating with only the client device 302 or other peer devices, and not the server device 142.

In some example embodiments, the client device 302 can include an application driver 306 for performing the various functions and communications for device discovery and file transfer. In some example embodiments, the mobile device 201 may also include as part of the system software 223 a discovery module 308, a notify module 310, and a file transfer module 312.

In some example embodiments, the mobile device 201 including an application 225 (or "app") module for effecting user-level applications. Some example applications 225 include consumer applications including games (including single player games and multiplayer games), ringtones and wallpapers, music and audio, television, movies and video, sports, news and information, news and RSS (Really Simple Syndication), weather and travel, search and reference guides, medical guides and calculators, maps and travel, maps and navigation, travel companions, city and dining guides, mileage and expense tracking, health and fitness, health and nutrition, personal fitness, personal banking, stocks and financial news, time and expense tracking, photo management, documents and printing, task, contact and calendar management, time, expense and mileage tracking, clocks, calculators and other utilities, voice commands and voice recognition, social networking and instant messaging, conferencing and phone services, add-on accessories, GPS (Global Positioning System), digital pen and paper, and presentation and screen projection. Additional applications include business or enterprise applications including mobile solutions for line-of-business, sales force automation, field service automation and GPS tracking, remote IT (Information Technology) help desk, custom ERP (Enterprise Resource Planning) solutions, SCM (Supply Chain Management) and process management, business intelligence (analytics, reporting and alerting), mobile forms and custom developer tools, industry-specific mobile solutions such as financial services, health care government, law enforcement and public safety, professional services and legal, real estate, education, retail/wholesale, hospitality and leisure, manufacturing, hosted solutions for small-medium business and large enterprise such as hosted sales force automation, hosted field service automation and fleet management, hosted mobile forms and custom business solutions, hosted document management, hosted email and collaboration, employee productivity, document and content management, printing and faxing, business productivity tools and task management, navigation and mapping, unified communications and voice services. It may thus be appreciated that the term "application" or "app" can be distinguished from the term "system software", for example, such example "applications" may include user-level applications and/or interactions.

In some example embodiments, the mobile device 201 may further display a user interface 314 for interacting with a user of the mobile device 201, to operate the application 225. In some example embodiments, the same user is operating both the client device 302 and the mobile device 201. Note that, some example peer to peer connections 316 between the client device 302 and the mobile device 201 may not be limited to local networks or connections in close proximity but can include non-local networks such as the Internet.

In some example embodiments, the client device 302 may be a personal computer, a tablet-based computer, or a device configured similar to the mobile device 201.

Figure 4:
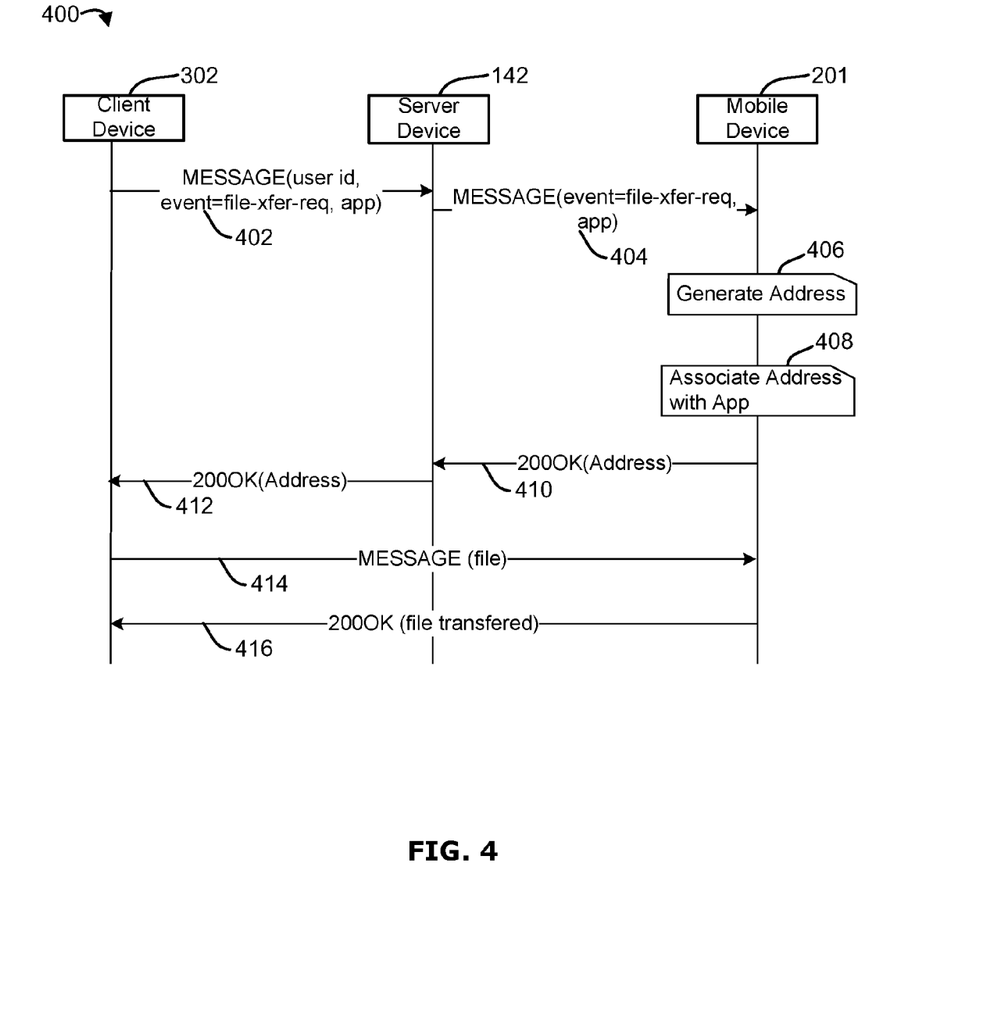
FIG. 4 shows, in flow diagram form, an example method for facilitating discovery of a device such as a mobile device in accordance with an example embodiment.

Reference is now made to FIG. 4, which shows, in flow diagram form, an example method 400 for facilitating discovery of an address of the mobile device 201. Generally, the client device 302 requests the address of the mobile device 201 and the request can include an identification of an application. The mobile device 201 is configured to receive, and subsequently interpret the request as an instruction or a request to associate a dynamic address of the mobile device 201 with the identified application of the mobile device 201.

In some example embodiments, both the mobile device 201 and the client device 302 have subscribed or logged into the server device 142, and a secure connection such as HTTPS/TLS is established with the server device 142. For example, some or all of the communications and events of the method 400 may be communicated using HTTPS/TLS.

At event 402, the client device 302 sends a communication to the server device 142 which includes a message having an identification of a device (Device ID) or user (User ID), an identification of a system software (Event=file transfer), and an identification of an application (App). The User ID can for example be an e-mail address or a user common name, while a Device ID may include a persistent device identifier such a Personal Identification Number. The App is included within an application identification field, wherein the application identification field is for identifying one of a plurality of applications. The Event is included within a system software identification field, wherein the identified system software can be used by the mobile device 201 for the receiving of further communications. Note that, the identified application in the application identification field is therefore distinguishable from the identified system software in the system software identification field, as they both may be received at event 402 but are used for different purposes.

At event 404, a communication is sent from the server device 142 to the identified mobile device 201, wherein the communication includes a message including identification of the Event and the App. At event 406, in response to receiving of the communication at event 404, the mobile device 142 generates a dynamic address of the mobile device 142. In some example embodiments, this includes the mobile device 142 generating a dynamic address. In other example embodiments, this includes the mobile device 142 being assigned a dynamic address from another server (not shown). At event 408, in response to receiving the communication at event 404, the mobile device 201 associates the dynamic address of the mobile device 201 with the identified application. For example, the mobile device 201 interprets the communication at event 404 as being an instruction or a request to associate the dynamic address with the identified application. The identified system software is interpreted by the mobile device 201 as a protocol or type of communication to expect at the dynamic address when receiving of further communications.

In some example embodiments, at event 406 a token may be generated by the mobile device 201, to facilitate secure communications at the dynamic address. The token is included within the 200 OK message at event 410. Thus, when receiving subsequent communications from the client device 302, the client device 302 presents the token for verification and authentication by the mobile device 201. Third party tokens or token services may also be used in some example embodiments.

At event 410, the mobile device 201 sends a communication directly or indirectly to the client device 302 which includes the dynamic address. For example, event 410 shows a 200 OK message sent to the server device 142 which includes the dynamic address. At event 412, the server device 142 sends a 200 OK to the client device 302 which includes the dynamic address.

In some example embodiments, both the mobile device 201 and the client device 302 have access to a same encryption key. The encryption key may be based on a shared secret accessible by both the mobile device 201 and the client device 302. In some example embodiments, the dynamic address is encrypted by the encryption key prior to sending to the client device 302 at event 410. For example, this avoids the server device 142 from intercepting the dynamic address, or other man in the middle attacks. The encrypted dynamic address is then decrypted by the client device 302.

In other example embodiments, at event 402 the client device 302 sends a public key within the message. In some example embodiments, at event 410 the dynamic address is encrypted by the mobile device 201 using the public key prior to sending to the client device 302. The client device 302 can then decrypt the encrypted dynamic address using a corresponding private key or decryption key. The server device 142 would not be able to intercept the encrypted dynamic address, as it does not have access to the private key or decryption key.

At event 410, the communication may include multiple candidate addresses rather than a single address or URL. For example, the mobile device 201 could return three addresses for a single request: one composed of a local subnet IP address, one of an external public IP address, and one of a separate proxy server (e.g. a Traversal Using Relay NAT (TURN) server).

At event 414, now that the client device 302 has discovered the mobile device 201, the client device 302 sends a further communication to the dynamic address, which can include a file or a document. For example, the communication can be an HTTP post to the address. The particular format of a peer to peer connection may be previously identified in the identification of the system software (at message 404). For example, the Event "file-xfer-req" can be interpreted by the mobile device 201 as being in relation to a subsequent HTTP post message to be allocated to the dynamic address. In some example embodiments, the connection established at event 414 may be performed over HTTPS.

In some example embodiments, the encryption key is used by the client device 302 to encrypt the file. The encrypted file is sent to the mobile device 201 at event 416, which may then decrypt the file using the encryption key or a corresponding decryption key. Additional security features are described in detail herein.

At this stage, at event 414, the mobile device 201 receives the communication (including the file), and may authenticate the communication (e.g. using the token and/or HTTPS). The mobile device 201 then internally checks which application that the file is to be associated with, based on the file being received at the particular address (e.g., rather than the communication of event 414 identifying the application). At event 416, a 200 OK confirmation is sent back to the communication device 302.

The application 225 of the mobile device 201 may be notified at this time. The application 225 can thus perform a particular application function when the file is received. In some example embodiments, the application function is automatically performed after receipt and verification of the communication at event 416.

It may thus be appreciated that the term "application" can be distinguished from the term "system software", e.g., the system software is the module which is configured using system-level protocols or automated methods or daemons which implement the protocols or formats to actually receive the file. Examples of "applications", described in detail above, may include user-level applications and interaction.

Figure 5:
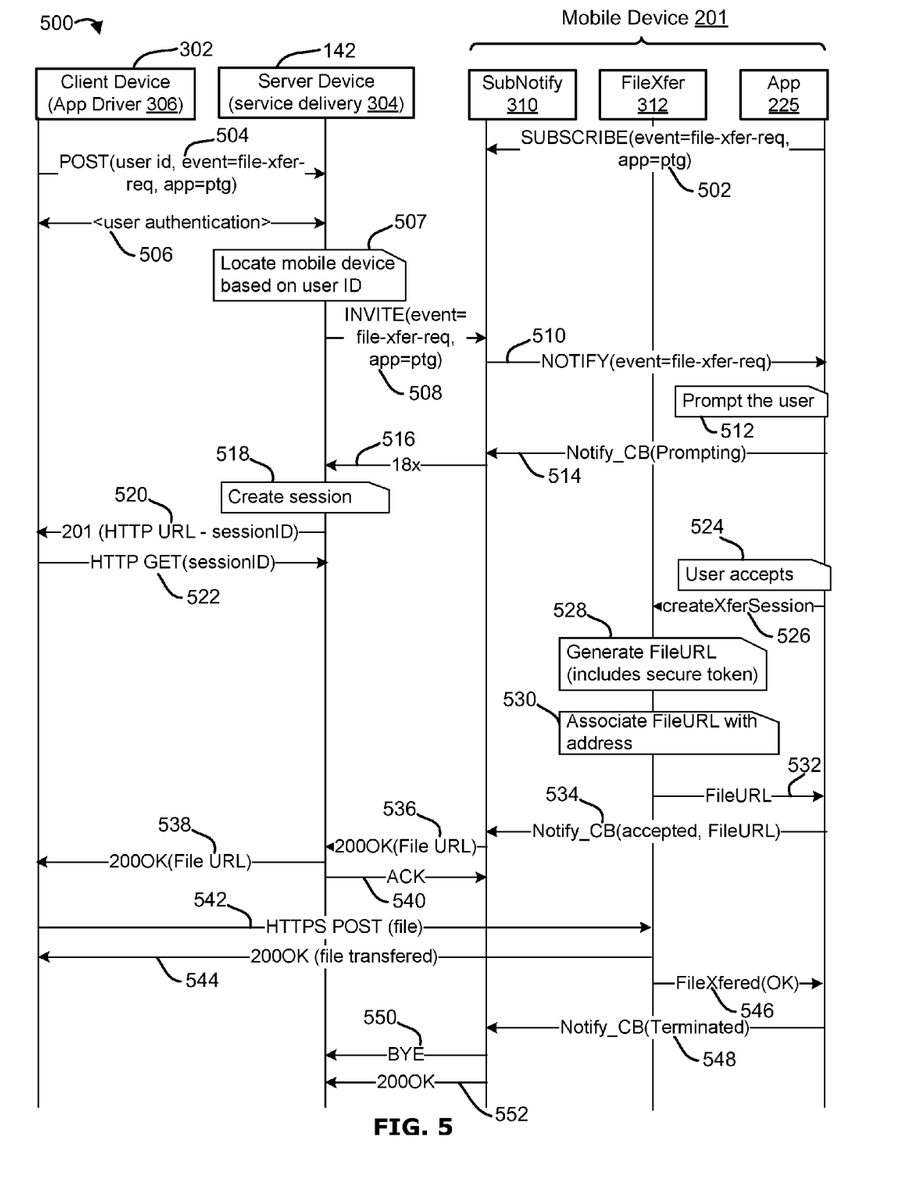
FIG. 5 shows, in flow diagram form, a detailed example method for facilitating discovery of a mobile device in accordance with an example embodiment, having a session-based call flow.

Reference is now made to FIG. 5, which shows, in flow diagram form, a detailed example method 500 for facilitating discovery of the mobile device 201 in accordance with an example embodiment. The example embodiment shown can include session-based communications, which can include establishing a session (e.g. starting with an INVITE message). The example embodiment shown may be implemented with or without user prompting through the user interface 314. In some example embodiments, a same user is operating or controlling both the client device 302 and the mobile device 201 (e.g. "me to me" sending).

In some example embodiments, both the mobile device 201 and the client device 302 have subscribed or logged into the server device 142, and a secure connection such as HTTPS/TLS is established with the server device 142. For example, some or all of the communications and events of the method 500 may be communicated using HTTPS/TLS.

At event 502, the application 225 subscribes to the notification module 310 using a SUBSCRIBE message. The subscription can include an identification of a system software (Event=file transfer) and an identification of the application (App). The particular system software can be interpreted from the application 225 based on the identification of the system software, and can include, for example, telnet, http, or ftp.

At event 504, the client device 302 sends a communication to the server device 142 which includes a HTTP POST message having an identification of a device or user (User ID), an identification of a system software (Event=file transfer), and an identification of an application (App). At event 506, a user authentication exchange is performed to authenticate the client device 302 from the server device 142. In some example embodiments, a "restricted" token is issued by the service delivery module 304 to the client device 302 for the purpose of the particular file transfer session.

At event 507, the server device 142 determines the location of the mobile device 201 identified in the User ID (typically by way of the mobile device 201 having already logged into the server device 142). The server device 142 may also contain a registry of devices and respective users.

At event 508, an INVITE message is sent from the server device 142 to the identified mobile device 201, wherein the INVITE includes identification of the Event and the App. In the example shown, the communication of event 508 is sent to the notify module 310. At event 510, the notify module 310 sends a NOTIFY message to the identified application 225. At event 512, in some example embodiments the application 225 prompts a user, for example through the user interface 314 (FIG. 3). The prompts can request whether the user wishes to accept a file transfer at the mobile device 201. At event 514, the application 225 sends a Notify callback message to the notify module 310, indicating that a prompting to the user is occurring. At event 516, the notify module 310 sends a SIP 18× informational response to the server device 142.

At event 518, the server device 142 creates a session identifier (session ID) in relation to obtaining the address. At event 520, the server device 142 sends a 201 message to the client device 302 with a session ID, indicating that a new resource is being created. At event 522, the client device 302 sends an HTTP GET message to the server device 142, referencing the session ID, in order to request the address (File URL) of the mobile device 201.

At event 524, in some example embodiments which include interaction through the user interface 314, the application 225 receives an acceptance from the user. In other example embodiments, user prompting is not required. It would be appreciated that the method 500 of FIG. 5 is flexible to accommodate both user prompting and no user prompting.

At event 526, the application 225 sends an instruction to the file transfer module 312 to create a transfer session. At event 528, the file transfer module 312 dynamically generates an address of the mobile device 201, which can be referred to as a dynamic address. At event 530, the file transfer module 312 associates the dynamic address with the application 225. In some example embodiments, the file transfer module 312 generates or obtains a token for subsequent authentication of communications received at the dynamic address. The token is included or embedded with the dynamic address. In some example embodiments, the file transfer module 312 encrypts the dynamic address using an encryption key or part of a key pair. Thus, in some example embodiments, subsequent secure communications may include the token and may include the dynamic address being an encrypted address.

At event 532, the file transfer module 312 sends the dynamic address to the application 225. At event 534, the application 225 sends a Notify message, which indicates the dynamic address and an acceptance of the file transfer request. At event 536, the notify module 310 sends a 200 OK message to the server device 142, and includes within the message the dynamic address. At event 538, this message is passed to the client device 302. At event 540, the server device 540 sends an ACK message to the notify module 310.

In some example embodiments, the encrypted dynamic address is decrypted using a key (or part of a key pair) by the client device 302. The client device 302 now has knowledge of the dynamic address of the mobile device 201.

At event 542, now that the client device 302 has discovered the mobile device 201, the client device 302 sends a further communication to the dynamic address, which can include a file or a document. For example, the communication can be an HTTPS post to the address. In some example embodiments, the file can be encrypted using an encryption key or part of a key pair. The particular format of a peer to peer connection may be previously identified in the identification of the system software (at message 508). For example, the Event "file-xfer-req" can be interpreted by the mobile device 201 as being in relation to a subsequent HTTPS post message to be allocated to the dynamic address.

At this stage, the mobile device 201 receives the communication (including the file), may authenticate the communication (e.g. using the token and/or HTTPS), and checks which application the file is to be associated with, based on the file being received at the dynamic address. At event 544, the file transfer module 312 sends a 200 OK confirmation back to the communication device 302. At event 546, the file transfer module 312 sends a message to the application 225 indicating successful file transferring. At event 548, the application 225 sends a Notify message to the notify module 310 to terminate the session. At event 550, the notify module sends a BYE message to the server device 142, ending the SIP session. At event 552, a 200 OK message is sent.

The application 225 can thus perform a particular application function when the file is received. In some example embodiments, the application function is automatically performed after receipt and verification of the communication at event 546.

In some example embodiments, filenames of the received files are assigned unique file names by the file transfer module 312, for example by appending a timestamp or something of that nature to the original filenames. For example, this can assist in any handling of duplicate file names or overwriting existing files.

Some additional example functions of the server device 142 will now be described, in accordance with some example embodiments. In some example embodiments, the server device 142 stores or queues the initial request message (event 504). This assists when the mobile device 201 is unavailable or cannot be located. In other example embodiments, no storing or queuing is performed and an error message is sent to the client device 302 should the mobile device 201 be unavailable. In some example embodiments the server device 142 tracks the number of file transactions. In some example embodiments, multiple files are sent by implementing multiple "sessions", with several file transfers taking place simultaneously or sequentially.

To facilitate discovery between the client device 302 and other devices, the discovery module 308 can expose publically a RESTful interface for the purpose of discovering the mobile device 201 and notifying the client device 302 (e.g. using SIP). A new DNS domain name can be created by the discovery module 308 for the client device 302 to use for subsequent HTTPS communication. This may be configured in a Global Traffic Manager (GTM). In some example embodiments, a "restricted" token may be issued by the client device 302 for the purpose of the particular file transfer session. The restricted token may be revocable in some example embodiments.

When the discovery module 308 receives multiple dynamic addresses from the application 225, the service delivery module 304 may then generate an address field with a skeleton URL which may be used by other devices to reach the application 225 (i.e., the skeleton URL is the dynamic address which is externally communicated and used by external devices). The multiple dynamic addresses may be assigned to the skeleton URL. The multiple dynamic addresses may be received by the discovery module 308 in the form of a candidates list to facilitate Session Traversal Utilities for NAT/Traversal Using Relay NAT/Interactive Connectivity Establishment (STUN/TURN/ICE), as would be understood in the art.

Referring again to FIG. 3, the peer to peer 316 connection between the client device 302 and the mobile device 201 will be described in greater detail. In example embodiments, this is performed over HTTPS. The certificate for HTTPS may be signed from a self-signed certificate of the mobile device 201, or may be signed from a root certificate from a third party certification authority (CA).

In order to provide the encryption of the dynamic address based on a common encryption key, the following process may be used: 1) when a user runs or installs the application driver 306 on the client device 302, prompt the user to enter a key/password; 2) when the user runs or installs the application 225 on the mobile device 201, prompt the user to enter the same key/password; 3) The file to be transferred will be encrypted by the client device 302 with this key, and decrypted upon receipt on the mobile device 201 using the same shared key. Note that 1) and 2) above can happen in any order. Accordingly, even if the server device 142 accesses the encrypted file, the server device would not be able to read the file. In some example embodiments, the same encryption key may be used to encrypt the dynamic address when sending from the mobile device 201 to the client device 302. In some example embodiments, for extra security, the shared key can be used to negotiate a session key which is used to encrypt the file for that particular session, using an algorithm and key exchange procedure such as in EC-SPEKE. Similar methods may be used to negotiate a key pair, rather than a shared encryption key.

In some example embodiments, a file may be sent to multiple devices at one time. For example, referring to the device ID at event 504, if the value is blank the service delivery module 304 may select the first online/in-coverage device to send the request to. If a user has only one device, the device ID may not need to be included. For example, from an API point of view, DeviceID=<identify device> may mean that the specific device of this user will be targeted. If the mobile device 201 is not in coverage, an error will be returned. The DeviceID=" " may mean that the service delivery module 304 selects the first online/in-coverage device registered to the same user (or group) as the client device 302). The DeviceID="*" may mean that the service delivery module 304 will target all online/in-coverage devices of the same user or group of the client device 302.

Some example embodiments have been described as a "me to me" communication with a common user. In other example embodiments, "me to you" implementations may be supported, such that in the client device 302 the shared key is assigned on a per destination basis. In other examples, keys may be given to users by using other key sharing means. When a group of devices is supported, the group can share a key.

In some example embodiments, it would be appreciated that the dynamic address may be generated from the mobile device 201 and may not be merely an assigned address from an external DNS server or router device. The dynamic address can be exclusively associated to the particular identified application.

The particular format of the dynamic address will now be described in greater detail. For example, the format of the dynamic address may depend on the type of system software being used to receive or process subsequent files or documents. Examples of system software can include, for example, a telnet server, an http server, or an ftp server.

Accordingly, the dynamic address may vary depending on the particular application. Examples of the dynamic address include:
http://myipaddress:myport/this/file/location.html?moreinfo=this;
ftp://username:password@myipaddress:myport/; and
http://10.251.223.32:80/fileXfer?appid=PTG&tid=94ADFA7EBE50173613CD6B8098D15743.

The example addresses "Myipaddress" and "myport" could vary depending on the interface (cellular interface, wifi, VPN), which facilitates multiple URLs. In other example embodiments, the address may be based on a TURN server or some other sort of proxy, and that value could be dynamically obtained once the turn server is configured to expect that connection. An example dynamic address is as follows:
http://turnserveripaddress:turnserverport/servicename/?value=1234.

Figure 6:
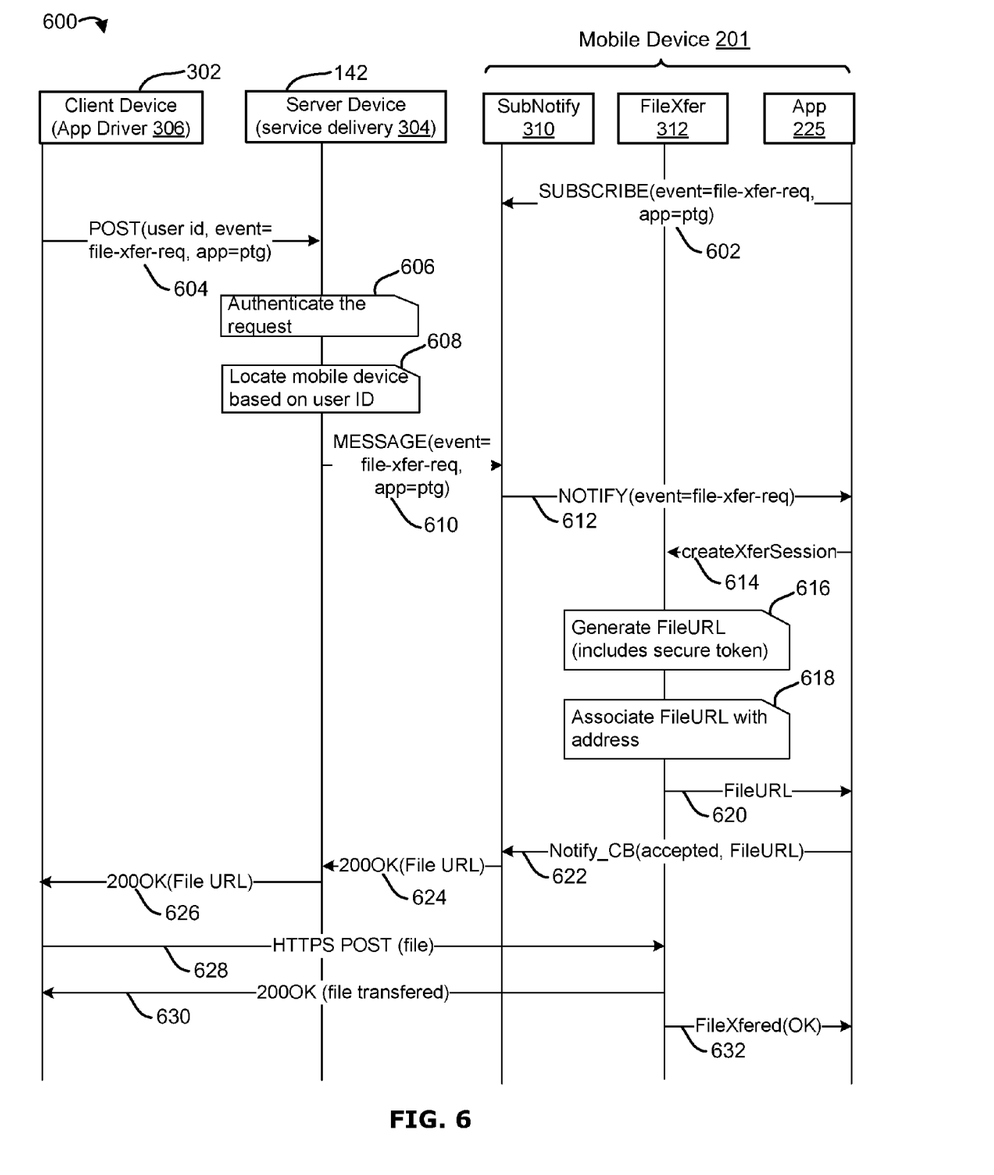
FIG. 6 shows, in flow diagram form, a detailed example method for facilitating discovery of a mobile device in accordance with an example embodiment, having a transaction-based call flow.

Reference is now made to FIG. 6, which shows, in flow diagram form, a detailed example method 600 for facilitating discovery of a mobile device 201 in accordance with an example embodiment. The example shown may use a transaction-based call flow, which may not require an INVITE to initiate creation of a session. Rather, any message can be used for establishing the session. The example embodiment shown may be implemented with or without user prompting through the user interface 314. In some example embodiments, a same user is operating or controlling both the client device 302 and the mobile device 201 (e.g. "me to me" sending).

In some example embodiments, both the mobile device 201 and the client device 302 have subscribed or logged into the server device 142, and a secure connection such as HTTPS/TLS is established with the server device 142. For example, some or all of the communications and events of the method 600 may be communicated using HTTPS/TLS.

At event 602, the application 225 subscribes to the notification module 310 using a SUBSCRIBE message. The subscription can include an identification of a system software (Event=file transfer) and an identification of the application (App).

At event 604, the client device 302 sends a communication to the server device 142 which includes a HTTP POST message having an identification of a device or user (User ID), an identification of a system software (Event=file transfer), and an identification of an application (App). At event 606, the server device 142 authenticates the client device 302.

At event 608, the server device 142 determines the location of the mobile device 201 identified in the User ID (typically by way of the mobile device 201 having already logged into or registered with the server device 142).

At event 610, a message is sent from the server device 142 to the identified mobile device 201, wherein the message includes identification of the Event and the App. In the example shown, the communication of event 508 is sent to the notify module 310. At event 612, the notify module 310 sends a NOTIFY message to the identified application 225.

At event 614, the application 225 sends an instruction to the file transfer module 312 to create a transfer session. At event 616, the file transfer module 312 dynamically generates an address of the mobile device 201, which can be referred to as a dynamic address. At event 618, the file transfer module 312 associates the dynamic address with the application 225. In some example embodiments, the file transfer module 312 generates or obtains a token for subsequent authentication of communications received at the dynamic address. The token is included or embedded with the dynamic address. In some example embodiments, the file transfer module 312 encrypts the dynamic address using an encryption key or part of a key pair. Thus, in some example embodiments, subsequent communications may include the token and may include the dynamic address being an encrypted address.

At event 620, the file transfer module 312 sends the dynamic address to the application 225. At event 622, the application 225 sends a Notify message, which indicates the dynamic address and an acceptance of the file transfer request. At event 624, the notify module 310 sends a 200 OK message to the server device 142, and includes within the message the dynamic address. At event 626, this message is passed to the client device 302.

In some example embodiments, the encrypted dynamic address is decrypted using a key (or part of a key pair) by the client device 302. The client device 302 now has knowledge of the dynamic address of the mobile device 201.

At event 628, now that the client device 302 has discovered the mobile device 201, the client device 302 sends a further communication to the dynamic address, which can include a file or a document. For example, the communication can be an HTTPS post to the address. In some example embodiments, the file can be encrypted using an encryption key or part of a key pair. The particular format or type of a peer-to-peer connection may be previously identified in the identification of the system software (at message 610). For example, the Event "file-xfer-req" can be interpreted by the mobile device 201 as being in relation to a subsequent HTTPS post message to be allocated to the dynamic address.

At this stage, the mobile device 201 receives the communication (including the file), may authenticate the communication (e.g. using the token and/or HTTPS), and checks which application the file is to be associated with, based on the file being received at the dynamic address. At event 630, the file transfer module 312 sends a 200 OK confirmation back to the communication device 302. At event 632, the file transfer module 312 sends a message to the application 225 indicating successful file transferring.

The application 225 can thus perform a particular application function when the file is received. In some example embodiments, the application function is automatically performed after receipt and verification of the communication at event 632.

Referring again to FIG. 3, in some example embodiments, the application driver 306 may be used to implement a "printing" or "print to go (ptg)" type function which is implemented from a print driver, to facilitate printing or sending of a file or document onto the mobile device 201 after discovery of the address of the mobile device 201. For example, the printing function may appear as a printer option when printing a document, to print to the mobile device 201 as if it were a printer. Similarly, the application 225 of the mobile device 201 may include a "printing" or "print to go (ptg)" application 286 (FIG. 2). The application 286 may be used for receiving the file or document received at a designated address of the mobile device 201, and displaying of the file or document. In some example embodiments, the file or document is automatically displayed. In some example embodiments, the file is converted to portable document format (PDF), and transferred securely to the mobile device 201 for viewing. Other features such as annotating and commenting may be included in some example embodiments.

While some of the present embodiments are described in terms of methods, a person of ordinary skill in the art will understand that present embodiments are also directed to various apparatus such as a handheld electronic device including components for performing at least some of the aspects and features of the described methods, be it by way of hardware components, software or any combination of the two, or in any other manner. Moreover, an article of manufacture for use with the apparatus, such as a pre-recorded storage device or other similar non-transitory computer readable medium including program instructions recorded thereon, or a computer data signal carrying computer readable program instructions may direct an apparatus to facilitate the practice of the described methods. It is understood that such apparatus, articles of manufacture, and computer data signals also come within the scope of the present example embodiments.

While some of the above examples have been described as occurring in a particular order, it will be appreciated to persons skilled in the art that some of the messages or steps or processes may be performed in a different order provided that the result of the changed order of any given step will not prevent or impair the occurrence of subsequent steps. Furthermore, some of the messages or steps described above may be removed or combined in other embodiments, and some of the messages or steps described above may be separated into a number of sub-messages or sub-steps in other embodiments. Even further, some or all of the steps of the conversations may be repeated, as necessary. Elements described as methods or steps similarly apply to systems or subcomponents, and vice-versa. Reference to such words as "sending"

or "receiving" could be interchanged depending on the perspective of the particular device.

The term "computer readable medium" as used herein includes any medium which can store instructions, program steps, or the like, for use by or execution by a computer or other computing device including, but not limited to: magnetic media, such as a diskette, a disk drive, a magnetic drum, a magneto-optical disk, a magnetic tape, a magnetic core memory, or the like; electronic storage, such as a random access memory (RAM) of any type including static RAM, dynamic RAM, synchronous dynamic RAM (SDRAM), a read-only memory (ROM), a programmable-read-only memory of any type including PROM, EPROM, EEPROM, FLASH, EAROM, a so-called "solid state disk", other electronic storage of any type including a charge-coupled device (CCD), or magnetic bubble memory, a portable electronic data-carrying card of any type including COMPACT FLASH, SECURE DIGITAL (SD-CARD), MEMORY STICK, and the like; and optical media such as a Compact Disc (CD), Digital Versatile Disc (DVD) or BLU-RAY Disc.

Variations may be made to some example embodiments, which may include combinations and sub-combinations of any of the above. The various embodiments presented above are merely examples and are in no way meant to limit the scope of this disclosure. Variations of the innovations described herein will be apparent to persons of ordinary skill in the art having the benefit of the present disclosure, such variations being within the intended scope of the present disclosure. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present disclosure as a whole. The subject matter described herein intends to cover and embrace all suitable changes in technology.

What is claimed is:

1. A method for facilitating discovery of a peer mobile communication device, the method being performed by the peer mobile communication device, the method comprising:
   receiving in the peer mobile communication device a communication from a peer device via a server device, wherein both the peer mobile communication device and the peer device had established a secure connection with the server device, the communication including both a request for an address and an identification of an application loaded onto the peer mobile communication device;
   in response to receiving the communication, the peer mobile communication device associating a dynamic address of the peer mobile communication device with the identified application;
   sending a second communication directly or indirectly to the peer device, the second communication including the dynamic address,
   receiving a further communication including a file at the dynamic address using system software for receiving network communications; and
   automatically performing, after the system software has successfully received the file at the dynamic address, an application function on the file using the identified application.

2. The method as claimed in claim 1, further comprising the peer mobile communication device generating the dynamic address in response to receiving the communication.

3. The method as claimed in claim 1, further comprising, in response to receiving the further communication, automatically associating the file with the identified application.

4. The method as claimed in claim 3, wherein said communication further includes an identification in relation to the system software which is not the identified application, wherein the identified system software is of a format or protocol used by the peer mobile communication device, for the receiving of the further communication.

5. The method as claimed in claim 3, wherein the second communication further includes a token, further comprising verifying the token to establish a secure connection to receive the further communication.

6. The method as claimed in claim 3, further comprising decrypting at least part of the further communication using an encryption key or a corresponding decryption key, wherein the encryption key or the decryption key is accessible by the peer mobile communication device.

7. The method as claimed in claim 1, wherein the sending of the second communication is sent via the server device.

8. The method as claimed in claim 7, further comprising encrypting the dynamic address with an encryption key prior to said sending, wherein the encryption key or a corresponding decryption key is accessible by the peer device and not the server device.

9. The method as claimed in claim 7, further comprising designating the dynamic address for communication with the peer device and not the server device.

10. The method as claimed in claim 1, further comprising designating the dynamic address with multiple dynamic addresses of the identified application.

11. The method as claimed in claim 1, wherein the automatic application function includes:
   converting the file; and
   outputting the converted version of the file to an output device.

12. The method as claimed in claim 1, wherein associating further comprises exclusively associating the dynamic address with the identified application.

13. A peer mobile communication device, comprising:
   a processor;
   memory; and
   a communication subsystem for sending and receiving communications,
   the processor being configured for:
   receiving in the peer mobile communication device a communication from a peer device via a server device, wherein both the peer mobile communication device and the peer device had established a secure connection with the server device, the communication including both a request for an address and an identification of an application loaded onto the peer mobile communication device,
   in response to receiving the communication, associating a dynamic address of the peer mobile communication device with the identified application,
   sending a second communication directly or indirectly to the peer device, the second communication including the dynamic address,
   receiving a further communication including a file at the dynamic address using system software for receiving network communications, and automatically performing, after the system software has successfully received the file at the dynamic address, an application function on the file using the identified application.

14. The peer mobile communication device as claimed in claim 13, wherein the processor is further configured for generating the dynamic address in response to receiving the communication.

15. The peer mobile communication device as claimed in claim 13, wherein the processor is further configured for, in response to receiving the further communication, automatically associating the file with the identified application.

16. The peer mobile communication device as claimed in claim 15, wherein said communication further includes an identification in relation to the system software which is not the identified application, wherein the identified system software is of a format or protocol used by the peer mobile communication device, for the receiving of the further communication.

17. The peer mobile communication device as claimed in claim 15, wherein the second communication further includes a token, wherein the processor is further configured for verifying the token to establish a secure connection to receive the further communication.

18. The peer mobile communication device as claimed in claim 15, wherein the processor is further configured for decrypting at least part of the further communication using an encryption key or a corresponding decryption key, wherein the encryption key or the decryption key is accessible by the peer mobile communication device.

19. The peer mobile communication device as claimed in claim 13, wherein the sending of the second communication is sent via the server device.

20. The peer mobile communication device as claimed in claim 19, wherein the processor is further configured for encrypting the dynamic address with an encryption key prior to said sending, wherein the encryption key or a corresponding decryption key is accessible by the peer device and not the server device.

21. The peer mobile communication device as claimed in claim 19, wherein the processor is further configured for designating the dynamic address for communication with the peer device and not the server device.

22. The peer mobile communication device as claimed in claim 13, wherein the processor is further configured for designating the dynamic address with multiple dynamic addresses of the identified application.

23. The peer mobile communication device as claimed in claim 13, wherein associating further comprises exclusively associating the dynamic address with the identified application.

24. A non-transitory computer readable medium having instructions stored thereon executable by a processor of a peer mobile communication device for facilitating discovery of the peer mobile communication device, the instructions comprising instructions for:
  receiving in the peer mobile communication device a communication from a peer device via a server device, wherein both the peer mobile communication device and the peer device had established a secure connection with the server device, the communication including both a request from the peer device for an address and an identification of an application loaded onto the peer mobile communication device;
  in response to receiving the communication, the peer mobile communication device associating a dynamic address of the peer mobile communication device with the identified application;
  sending a second communication directly or indirectly to the peer device, the second communication including the dynamic address,
  receiving a further communication including a file at the dynamic address using system software for receiving network communications, and
  automatically performing, after the system software has successfully received the file at the dynamic address, an application function on the file using the identified application.

* * * * *